United States Patent
Raggl et al.

(10) Patent No.: US 10,076,830 B2
(45) Date of Patent: Sep. 18, 2018

(54) CONTROL METHOD FOR HAND TOOL MACHINE

(71) Applicant: Hilti Aktiengesellschaft, Schaan (LI)

(72) Inventors: Klaus Raggl, Zürich (CH); Christoph Boehm, Gams (CH)

(73) Assignee: Hilti Aktiengesellschaft, Schaan (LI)

( * ) Notice: Subject to any disclaimer, the term of this patent is extended or adjusted under 35 U.S.C. 154(b) by 255 days.

(21) Appl. No.: 14/904,265

(22) PCT Filed: Jul. 15, 2014

(86) PCT No.: PCT/EP2014/065079
§ 371 (c)(1),
(2) Date: Jan. 11, 2016

(87) PCT Pub. No.: WO2015/007705
PCT Pub. Date: Jan. 22, 2015

(65) Prior Publication Data
US 2016/0144495 A1  May 26, 2016

(30) Foreign Application Priority Data

Jul. 16, 2013  (EP) ..................... 13176598

(51) Int. Cl.
*B25C 1/08* (2006.01)
*B25C 1/00* (2006.01)
(Continued)

(52) U.S. Cl.
CPC ............... *B25C 1/08* (2013.01); *B25C 1/008* (2013.01); *B25C 1/06* (2013.01); *B25C 1/10* (2013.01);
(Continued)

(58) Field of Classification Search
CPC .. B25C 1/10; B25C 1/085; B25C 1/08; B25C 1/06; B25C 1/008; G05B 9/02;
(Continued)

(56) References Cited

U.S. PATENT DOCUMENTS

| | | | |
|---|---|---|---|
| 5,390,105 A * | 2/1995 | Worley | G05B 9/02 198/301 |
| 2004/0045997 A1 | 3/2004 | Birk et al. | |

(Continued)

FOREIGN PATENT DOCUMENTS

| | | | | |
|---|---|---|---|---|
| CA | 2729529 A1 * | 7/2011 | | B25C 1/08 |
| CN | 201198823 Y | 2/2009 | | |

(Continued)

OTHER PUBLICATIONS

International Bureau, International Search Report in International Application No. PCT/EP2014/065079, dated Oct. 16, 2014.

*Primary Examiner* — Jermie Cozart
(74) *Attorney, Agent, or Firm* — Leydig Voit & Mayer

(57) ABSTRACT

The invention relates to a hand tool machine for placing a nail having a push button that can be activate by a user for placing a nail. A combustion chamber is provided, in which a mixture of combustible gas and air can be ignited. In the combustion chamber, a piston is arranged in a movable manner in order to be accelerated by the combustion gases in the direction of placement. In the direction of placement, the piston has a punch protruding from the piston for driving the nail. A compressor compresses the air in the combustion chamber prior to igniting. The compressor has a fan wheel and an electric motor. At an operating speed of the electric motor, the fan wheel has a rotational speed of at least 2,000 rotations per second.

9 Claims, 4 Drawing Sheets

(51) Int. Cl.
    *B25C 1/10*     (2006.01)
    *B25C 1/06*     (2006.01)
    *G05B 19/048*     (2006.01)
    *G05B 9/02*     (2006.01)

(52) U.S. Cl.
    CPC .............. *G05B 9/02* (2013.01); *G05B 19/048* (2013.01); *Y10T 29/49771* (2015.01); *Y10T 29/49778* (2015.01); *Y10T 29/53039* (2015.01); *Y10T 29/53061* (2015.01)

(58) Field of Classification Search
    CPC .............. G05B 19/048; G05B 19/0405; Y10T 29/49771; Y10T 29/49778; Y10T 29/53039; Y10T 29/53061
    See application file for complete search history.

(56) References Cited

U.S. PATENT DOCUMENTS

| | | |
|---|---|---|
| 2004/0134961 A1 | 7/2004 | Wolf et al. |
| 2004/0182336 A1* | 9/2004 | Ohmori .................... B25C 1/08 123/46 R |
| 2006/0102111 A1* | 5/2006 | Ohmori .................... B25C 1/08 123/46 H |
| 2006/0260568 A1* | 11/2006 | Moeller .................... B25C 1/08 123/46 H |
| 2007/0059186 A1 | 3/2007 | Weaver et al. |
| 2007/0101954 A1* | 5/2007 | Zahner .................... B25C 1/08 123/46 H |
| 2007/0108249 A1 | 5/2007 | Moeller |
| 2009/0251330 A1* | 10/2009 | Gerold .................... B25C 1/08 340/12.22 |
| 2009/0254203 A1* | 10/2009 | Gerold .................... B25C 1/08 700/87 |
| 2009/0314817 A1* | 12/2009 | Moeller .................... B25C 1/08 227/2 |
| 2010/0108736 A1 | 5/2010 | Tanaka |
| 2011/0068142 A1 | 3/2011 | Webb |
| 2016/0144496 A1 | 5/2016 | Raggl et al. |

FOREIGN PATENT DOCUMENTS

| | | | | |
|---|---|---|---|---|
| EP | 2371491 A2 * | 10/2011 | .............. | B25C 1/08 |
| JP | 2011-520635 A | 7/2011 | | |
| TW | I317683 B | 12/2009 | | |
| WO | WO 2005/063449 A1 | 7/2005 | | |
| WO | WO 2007/116239 A1 | 10/2007 | | |
| WO | WO 2013/053002 A1 | 4/2013 | | |

\* cited by examiner

CONTROL METHOD FOR HAND TOOL MACHINE

CROSS-REFERENCE TO RELATED APPLICATIONS

The application is the U.S. National Stage of International Application Number PCT/EP2014/065079, filed on Jul. 15, 2014, which claims the benefit of European Patent Application Number 13176598.4, filed on Jul. 16, 2013, which are each incorporated by reference.

BACKGROUND OF THE INVENTION

The present invention relates to a handheld power tool as is known from U.S. 2010/108736 A or U.S. 2004/134961 A, among others. A combustion chamber having a piston is filled with air and a combustible gas. The gas mixture is ignited, whereupon the combustion gases accelerate the piston. The kinetic energy of the piston is used to drive a nail into a workpiece. A piston compressor compresses the air and feeds it into a reservoir. The combustion chamber is fed from the reservoir. The increased air pressure makes it possible to feed the same quantity of air for consumption in a smaller combustion chamber. However, the additional compressor and the energy source required therefor lead to an increased weight and size of the setting tool.

BRIEF SUMMARY OF THE INVENTION

The handheld power tool according to the invention for setting a nail has a switch that can be actuated by a user to trigger a setting of the nail. A combustion chamber is provided, in which a mixture of combustible gas and air can be ignited. A piston is movably arranged in the combustion chamber in order to be accelerated in the setting direction by the combustion gases. The piston has a punch protruding in the setting direction from the piston in order to set nails. A compressor compresses the air in the combustion chamber before the ignition. The compressor has a fan impeller and an electric motor. At an operational rotational speed of the electric motor, the fan impeller has a rotational speed of at least 2000 revolutions per second. A device controller accelerates the electric motor to the operational rotational speed in response to the pressing of the switch.

The use of the compressor with the very fast-rotating fan impeller proves advantageous for reducing the overall weight of the handheld power too. The additional weight for the compressor, including the power supply for the electric motor, is compensated by the reduced size of the combustion chamber. The rotational speed of the electric motor and the fan impeller are the same if the fan impeller is expediently mounted on the rotor shaft of the electric motor.

One design provides that the fan impeller delivers less than 5 ccm per revolution, preferably less than 2 ccm and preferably more than 0.5 ccm, particularly into the combustion chamber. The fan impeller is preferably a radial fan, more particularly one that blows out the air in the radial direction. Due to the size and construction of the radial fan, it is not capable of building up a high pressure difference, but is able to deliver a large air flow.

One design provides that the compressor increases the pressure in the combustion chamber to at least 1.3 times and at most 3.5 times the ambient pressure. For a compression [K] to be achieved, the operational rotational speed [D] in revolutions per second is at least $D=6700(K-1)$.

The compressor is preferably not operational until the setting of a nail is to be expected. The electric motor of the compressor is switched on as soon as a safety mechanism of the handheld power tool has been actuated. The compressor is switched off before the safety mechanism is actuated and after the ignition has taken place.

A control method for a handheld power tool for setting nails, wherein the handheld power tool comprises a combustion chamber, a compressor having a fan impeller and an electric motor, and a switch operable by the user, provides the following steps. The electric motor is accelerated to an operational rotational speed of more than 2000 revolutions per second as soon as the operator actuates the switch. In the process, the pressure in the combustion chamber is increased to a target pressure of at least 1.3 times the ambient pressure. The volume of the combustion chamber is preferably between 200 and 500 ccm. The impeller wheel has a delivery power of less than 5 ccm per revolution. A combustible gas is injected into the combustion chamber. The injection can take place before the target pressure has been achieved. The mixture of air and combustible gas is ignited as soon as the target pressure has been achieved. The target pressure can be determined directly or acquired via a time controller. Upon ignition, i.e. the achievement of the target pressure, the electric motor is switched off.

One design provides that the tool controller accelerates the electric motor from a standstill to at least 75% of the operational rotational speed when a safety mechanism is actuated. The electric motor is accelerated to the operational rotational speed when the switch is actuated after the safety mechanism.

One design provides that the handheld power tool determines the temperature of the surroundings and adjusts the operational rotational speed based on the temperature. At a lower temperature, a lower operational rotational speed is selected. The compression in the combustion chamber is adjusted on the basis of the operational rotational speed.

One design provides that the handheld power tool has a control element for the adjustment of a setting energy by the operator. The operational rotational speed is determined on the basis of the adjusted setting energy, and the quantity of combustible gas to be injected into the combustion chamber is likewise determined on the basis of the adjusted setting energy. The pressure achieved, and therefore the quantity of oxygen in the combustion chamber, can be adjusted by means of the operational speed. The mixing ratio can thus be retained or adjusted for an optimal combustion, in contrast to a mere adjustment of the quantity of combustible gas.

BRIEF DESCRIPTION OF THE SEVERAL VIEWS OF THE DRAWING(S)

The description below will explain the invention with reference to embodiment examples and figures. In the figures.

Identical or functionally identical elements are indicated by identical reference numbers in the figures unless otherwise indicated.

DETAILED DESCRIPTION OF THE INVENTION

Figure 1:
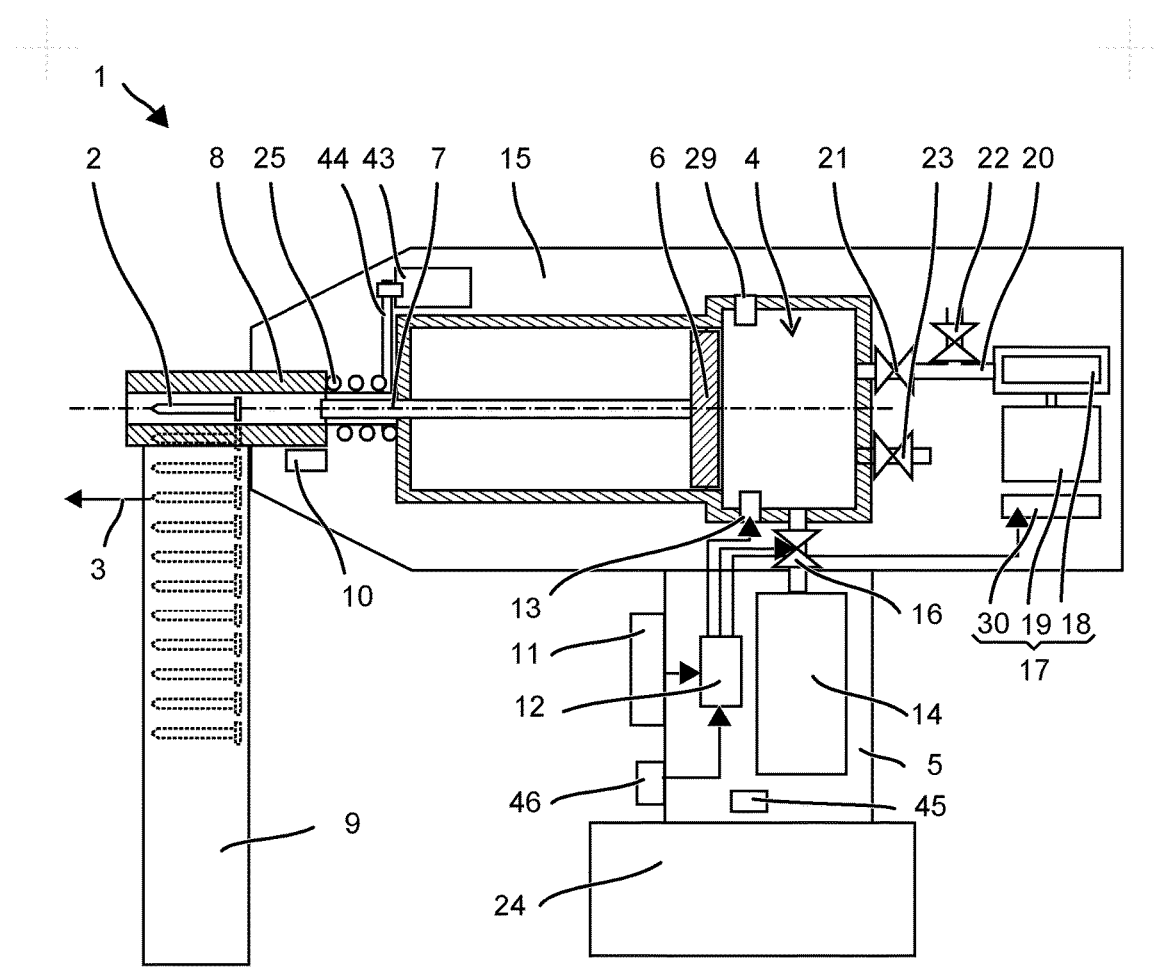
FIG. 1 shows a setting tool for nails.

FIG. 1 schematically shows a combustion-force-driven setting tool 1 for nails 2 as an example of a handheld power tool. The setting tool 1 presses the nail 2 in the setting direction into a workpiece. The energy necessary for this is provided by combusting a gas mixture in a combustion chamber 4 of the setting tool 1. The user can hold and guide the setting tool 1 during the operation, i.e. during setting of the nails 2, by means of a handle 5. The setting tool 1 is constructed accordingly compactly and light in weight for this purpose.

The combustion chamber 4 is closed off in the setting direction 3 by a piston 6 that is movable parallel to the setting direction 3. The piston 6 is accelerated in the setting direction 3 by the expanding combustion gases. The piston 6 is furnished with a punch 7 that protrudes into a barrel 8. A nail 2 can be placed in the barrel 8 individually by hand or automatically via a magazine 9. The punch 7, moved with the piston 6, presses the nail 2 out of the barrel 8 and into the workpiece.

The user triggers the setting process by actuating a safety switch 10 and a trigger switch 11. A tool controller 12 fills the combustion chamber 4 with the gas mixture in response to the actuation and ignites the gas mixture by means of an igniter 13 in the combustion chamber 4.

The gas mixture is composed of a combustible gas and air. The combustible gas preferably contains volatile short-chain hydrocarbons. The combustible gas is preferably provided by means of a cartridge 14. The cartridge 14 is arranged in a receptacle in the housing 15. The cartridge 14 can be removed and exchanged for a full cartridge 14, or the cartridge 14 can be refillable. A controllable metering valve 16 is arranged between the cartridge 14 and the combustion chamber 4. The tool controller 12 opens and closes the metering valve 16 and thus meters the amount of combustible gas that is fed into the combustion chamber 4 for a setting process.

The combustion chamber 4 is actively filled with air by a compressor 17. The air provides the oxygen necessary for the combustion. The compressor 17 includes a fan impeller 18 and a brushless electric motor 19. The fan impeller 18 is designed as a radial fan, which draws in the air along its axis and blows it out in the radial direction. The fan impeller 18 delivers less than 5 ccm (cubic centimeter) with one rotation, e.g. between 0.5 ccm and 2 ccm. The operational rotational speed is greater than 2000 (two thousand) revolutions per second (120,000 rpm), in order to achieve an air flow between 2000 ccm and 10,000 ccm per second.

The compressor 17 feeds the combustion chamber 4 directly. No buffer, which would be charged by the compressor 17 and from which the combustion chamber 4 would be filled when necessary, is included between the compressor 17 and the combustion chamber 4. A through-going duct 20 begins at the compressor 17 and ends at the combustion chamber 4. The duct 20 leads to an intake valve 21 of the combustion chamber 4. The intake valve 21 is controlled by the tool controller 12. The duct 20 has a bypass valve 22 in the illustrated example. The air flow generated by the compressor 17 can flow through the opened bypass valve 22 into the housing 15, i.e. into the surroundings. The tool controller 12 can close the bypass valve 22, whereupon the air stream flows completely into the combustion chamber 4. Alternatively or additionally, a bypass valve 23 can be provided in the combustion chamber 4. The air stream flows into the combustion chamber 4 and can escape through the opened bypass valve 23. The bypass valve 22, 23, possibly including additional lines, is designed to output an air flow of at least 1000 ccm per second into the surroundings when opened.

The electric motor 19 of the compressor 17 is fed from a battery 24. The battery 24 preferably contains battery cells based on a lithium-ion technology. The battery 24 can be permanently arranged in the housing 15 alongside the combustion chamber 4 and the compressor 17, or the battery 24 can alternatively be mounted removably on the housing 15.

Figure 2:
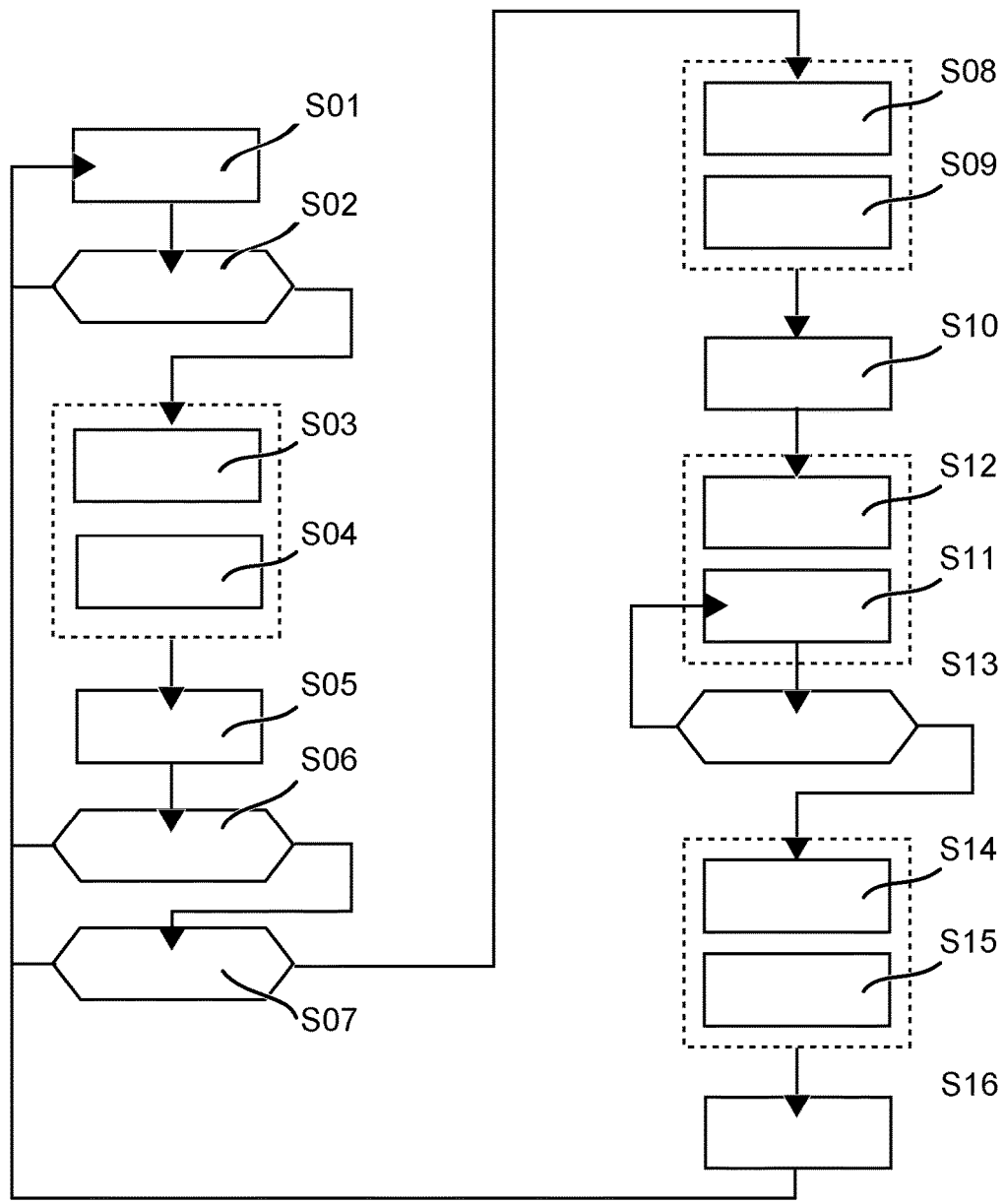
FIG. 2 shows a control diagram for the setting tool.
Figure 3:
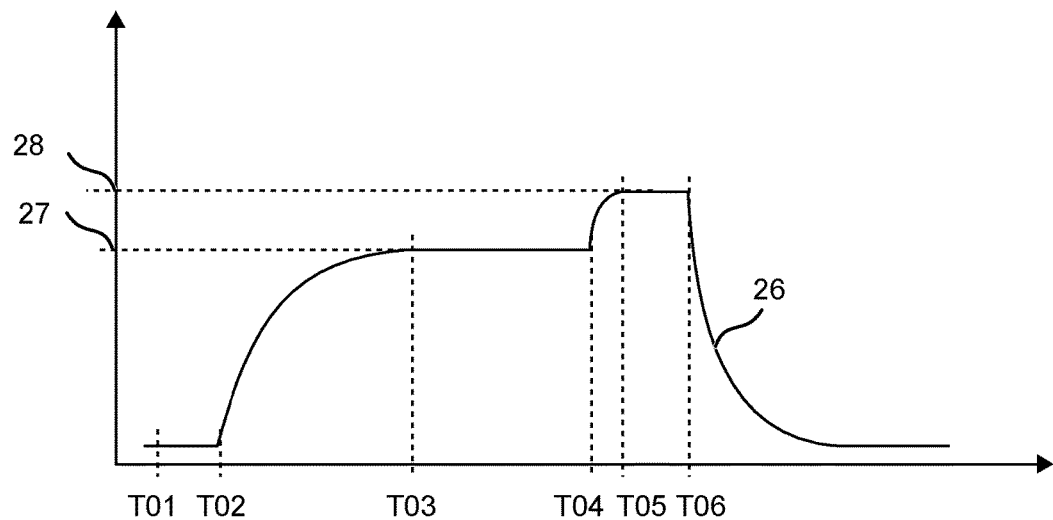
FIG. 3 shows a curve of the rotational speed of a compressor.
Figure 4:
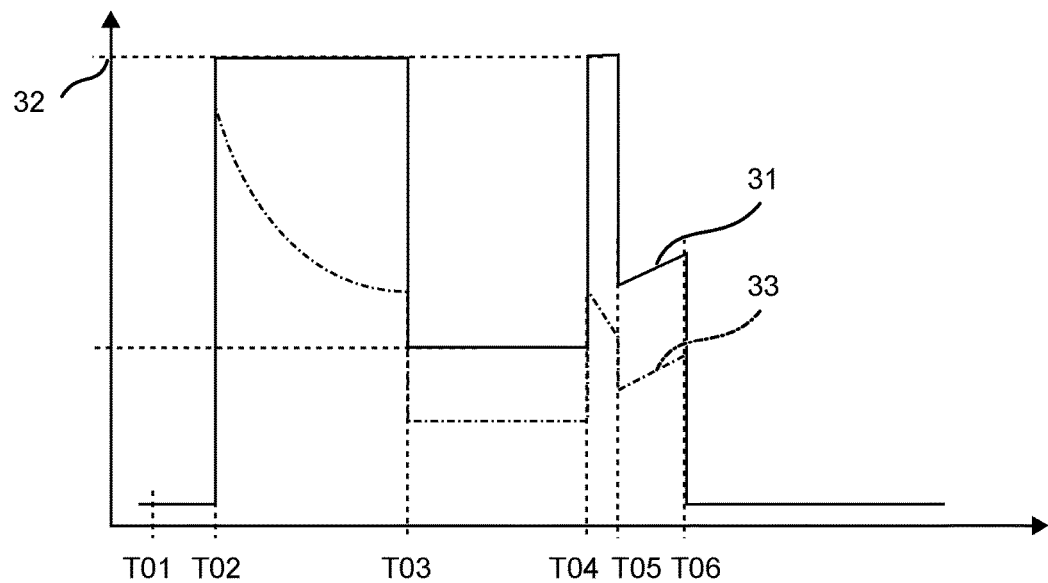
FIG. 4 shows a curve of the current or power consumption of an electric motor.

The setting process will be explained with reference to the control diagram in FIG. 2 and the time curve in FIG. 3. The setting tool 1 is initially T01 in an idle state S01. The combustion chamber 4 is vented; substantially only air at atmospheric pressure is present in the combustion chamber 4. The compressor 17 is switched off and is not delivering any air. The piston 6 is preferably in its position that minimizes the volume of the combustion chamber 4.

The user presses the barrel 8 against the workpiece. The barrel 8, shown for the sake of example, is displaceable into the housing 15 against the force of a spring 25. The safety switch 10 is actuated T02 in the process. The tool controller 12 continuously checks S02 whether the safety switch 10 is kept actuated. If the user releases the safety switch 10 by no longer pressing the setting tool 1 against the workpiece, the tool controller 12 interrupts the setting process and transfers the setting tool 1 into its idle state S01.

Responding to the actuation of the safety switch 10, the compressor 17 is switched on S03. The rotational speed 26 of the electric motor 19 is accelerated from initially zero to an intermediate value 27. The intermediate value 27 is above 2500 revolutions per second, for example. The intermediate value 27 is preferably between 50% and 90% of the operational rotational speed 28. The tool controller 12 opens S04 the bypass valve 22, 23, preferably at the beginning of or during the acceleration to the intermediate value 27. The intake valve 21 of the combustion chamber 4 can be opened during the process. If the bypass valve 23 is arranged in the combustion chamber 4, the intake valve 21 is opened with the bypass valve 23. After the intermediate value 27 is reached T03, the electric motor 19 holds S05 the rotational speed 26. The bypass valves 22, 23 remain completely opened. The tool controller 12 waits S06 for the actuation of the trigger switch 11. If the trigger switch 11 is not actuated within a predetermined period after the actuation T02 of the safety switch 10, the compressor 17 is switched off. The setting tool 1 returns to the idle state S01.

The user actuates the trigger switch 11 (T04) after actuation of the safety switch 10. The tool controller 12 checks S07 whether the safety switch 10 is still actuated; if not, the setting process is terminated. Responding to the actuated safety switch 10, the compressor 17 accelerates S08 to its operational rotational speed 28. The operational rotational speed 28 is greater than 2000 revolutions per second (180,000 rpm). The delivery power of the compressor 17 achieves a value of 3 liters per second to 10 liters per second.

The bypass valve 22 is closed S09, responding to the actuation of the trigger switch 11. The closing S09 takes place at the beginning T04 of the acceleration, for example, but can also take place during the acceleration or when the operational rotational speed 28 is reached T05. The air stream now flows completely into the combustion chamber 4. The combustion chamber 4 is not hermetically sealed, but rather enables an outflow of between 0.3 and 0.8 liters per second. For example, the bypass valve 23 can remain open or only partially closed. The tiny radial fan can build up only a slight static pressure difference. The mode of operation requires a continuously high air flow, even if the target pressure has been substantially achieved. The pressure in the combustion chamber 4 is increased to a target value between 1.3 and 3.5, since the inflow is greater than the outflow. The target (compression) is indicated without a unit as a ratio of the air pressure in the combustion chamber 4 to that of the surroundings. The compression is specified by the tool controller 12. The tool controller 12 determines a compression based on the ambient temperature and the ambient pressure. The tool controller 12 determines S10 a period (time T06) that the compressor 17 requires in order to achieve the compression in the combustion chamber 4. By that point, the compressor 17 is being operated S11 at the operational rotational speed 28.

After the bypass valves 22, 23 have been closed, the combustible gas is injected S12 into the combustion chamber 4. The tool controller 12 determines the amount of combustible gas based on the ambient temperature and ambient pressure. The amount of combustible gas and the amount of air are matched to one another in order to achieve a desired setting energy. The point in time for injecting the combustible gas is matched to the type of bypass valve 22, 23 used. For the bypass valve 23 downstream of the combustion chamber 4, it proves advantageous to inject the combustible gas into the combustion chamber 4 only shortly before the achievement of compression. The pressure in the combustion chamber 4 should have already reached more than 75% of the target pressure, for example. For the bypass valve upstream of the combustion chamber 4, it proves advantageous to inject a combustible gas at an early point, when essentially no pressure has built up in the combustion chamber 4. The combustion chamber 4 is not designed to be pressure-tight. An air flow out of the combustion chamber 4 is desired, since the fast-rotating compressor 17 requires a permanent air flow. However, the expensive combustion gas should not also be flushed out. The combustible gas should be fed in before reaching compression, however. Upon closure of the intake valve 21, the pressure rapidly decreases, at least 0.1 bar per 100 ms (milliseconds), for example.

As soon as the tool controller 12 determines S13 that the period has expired T06, i.e. the target pressure has been achieved, the intake valve 21 is closed S14 and the compressor 17 is switched off S15. Alternatively or additionally, a pressure sensor 29 that determines the achievement of compression can be provided in the combustion chamber 4.

As soon as the intake valve 21 is closed T06, the combustible gas is ignited S16. The tool controller 12 transmits a corresponding control signal to the igniter 13. The period T04-T06 between actuation of the trigger switch 11 by the user and ignition S15 lies in the range of 50 ms to 150 ms. The period T04-T06 is selected to be short in view of safety requirements. The user should not be able to lift the setting tool 1 away from the workpiece in this time. The piston 6 is accelerated as described and drives the nail 2 into the workpiece. The cooling down of the combustion gases causes a negative pressure in the combustion chamber 4, which draws the piston 6 back into its initial position. The intake valve 21 is closed, as is the bypass valve 23.

The compressor 17 and the battery 24 for supplying the compressor 17 are additional components that contribute with their weight to the overall weight of the setting tool 1. However, the compression of the air makes it possible to design the combustion chamber 4 to be smaller, since the same amount of oxygen is input into the smaller volume. The volume and weight of the combustion chamber 4 can be reduced. The effective weight reduction can probably only be achieved for a compression ratio between 1.3 and 3.5. The change in weight of the combustion chamber 4 for a compression ratio of less than 1.3 does not compensate for the additional components. A compression ratio of more than 3.5 does enable a very light combustion chamber 4, but the advantage is canceled out by the weight of the compressor or problems with the long-term durability of the compressor. With a compression between 1.3 and 3.5, a reduction of the overall weight can be achieved if the compressor 17 is designed with a high rotational speed 26 and a small radial fan. The rotational speed 26 should be more than 2000 revolutions per second. If a compression [K] of greater than 1.3 is required, an increase of the rotational speed [D] 26 of at least 67 revolutions per second is required for each percentage point of compression: D=6700 (K−1).

The electric motor 19 is fed from a battery pack 24. The high acceleration values of the electric motor 19 lead to high peak current which considerably stress common types of battery cells, particularly those based on lithium-ion technology. The electric motor 19 is therefore provided with a motor controller 30 that achieves the high acceleration with a moderate load on the battery pack 24. The motor controller 30 regulates the power consumption 31 of the electric motor 19 during the acceleration phase to a target power 32. The special feature of the regulated power consumption is that initially a high current 33 is fed into the still resting electric motor 19, and the current 33 is reduced with increasing rotational speed of the electric motor 19. The voltage 34 dropping across the electric motor 19, which defines the power consumption 31 when multiplied by the current 33, increases with the rotational speed 26.

Figure 5:
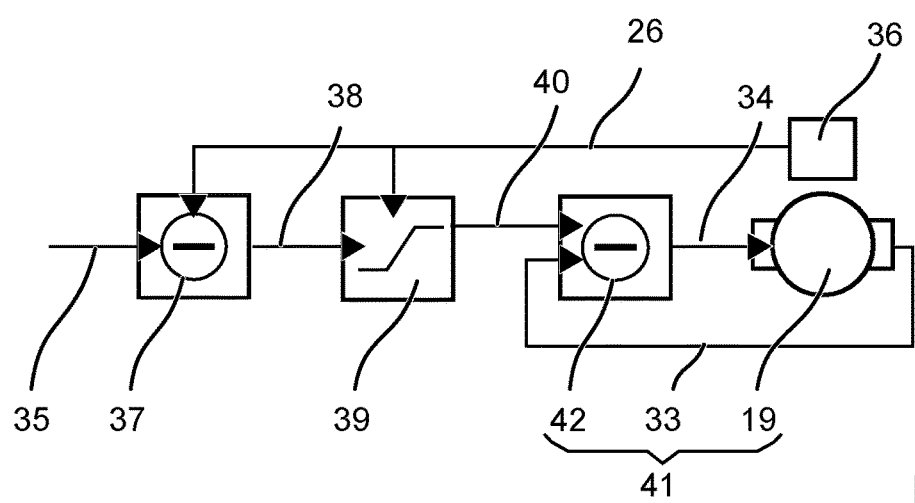
FIG. 5 shows a block diagram of a motor controller for the electric motor.

The motor controller 30 preferably regulates the rotational speed 26 of the electric motor 19 to a target value 35. Depending on the phase of the setting, the target 35 can be the intermediate value 27 or the operational rotational speed 28. An example of the motor controller 30 is shown in the block schematic diagram of FIG. 5. The electric motor 19 is equipped with a sensor 36 for determining the actual rotational speed 26 at a given time. The sensor 36 can include a Hall sensor, for example, or can determine the rotational speed based on the periodically varied induced voltage in the motor coils. Other sensors that are customary for brushless motors can likewise be used. A comparator 37 compares the target rotational speed 35 to the actual rotational speed 26 and outputs the corresponding control signal 38. The control signal 38 is a measure of the current that is to be fed into the electric motor 19. A limiter 39 compares the control signal 38 to a permissible limit value and reduces the control signal 38 to the limit value if the limit value is exceeded. The limited control signal 40 is fed to a control loop 41, which regulates the current 33 in the electric motor 19 to the limited control signal 40 by using a comparator 42. For example, the control loop 41 can vary the voltage 34 present at the electric motor 19, a pulse width ratio, etc., to regulate the current 33.

The speed regulation by the motor controller 30 is supplemented by a feedback of the actual rotational speed 26 to the limiter 39, in order to achieve the power regulation while accelerating. During the acceleration of the electric motor 19, the still large deviation of the actual rotational speed 26 from the target rotational speed 35 causes the limiter 39 to limit the control signal 38 to the limit value. The limiter 39 adjusts the limit value [G] in inverse proportion to the actual rotational speed [D] 26: G=a/D. The limit value is initially high for a low actual rotational speed 26, whereby a correspondingly high current 33 is fed into the electric motor 19 as demanded by the control signal 38. The highest current 33 results during acceleration from the idle state. A proportionality factor [a] is preferably selected such that the maximum permissible power is withdrawn from the battery 24 during acceleration from the idle state. The proportionality factor can be fixed. The proportionality factor is preferably determined as a function of the charge status of the battery 24. The proportionality factor is reduced with decreasing charge status. The proportionality factor can additionally be reduced as the ambient temperature decreases. The limit value is reduced as the actual rotational speed 26 increases, as is the current 33 flowing in the electric motor 19. If the electric motor 19 has reached the target rotational speed 35, the control signal 38 is small and is no longer influenced by the limit value. The power regulation is no longer active.

The motor controller 30 can likewise be used for a motor 43 that returns the piston 6 in the combustion chamber 4 opposite to the setting direction 3 to the home position. The motor 43 can be connected via a gear mechanism 44 to the piston 6. The gear mechanism 44 preferably has a freewheel, which decouples the motor 43 during a movement of the piston 6 in the setting direction 3.

The setting tool 1 has a temperature sensor 45 for determining the temperature of the surroundings. Based on the temperature, the tool controller 12 determines the amount of combustible gas and the amount of air for setting the nail 2 with the desired setting energy. The support table contains the amount of combustible gas and air and/or pressure in the combustion chamber 4 associated with different temperatures and different setting energies. The compression of the air is reduced as the temperature decreases, and the amount of combustible gas in the combustion chamber 4 is also reduced.

The setting device 1 can have a control element 46 that allows the user to adjust the setting energy. The variation of the setting energy is advantageous, for example, in order to optimize the setting in different substrates or the setting of a nail 2 when a soft washer made of silicone is used. The tool controller 12 detects the adjusted setting energy and determines the necessary quantity of combustible gas and the pressure to be achieved in the combustion chamber 4 on the basis of tables. The pressure defines the quantity of oxygen in the combustion chamber 4. The individual values can be determined by a series of experiments and stored in a table. The motor controller 30 preferably adapts the operational rotational speed 28 depending on the pressure to be achieved; for a reduced pressure, a lower rotational speed 26 is sufficient.

The invention claimed is:

1. A control method for a handheld power tool for setting nails, the handheld power tool having a combustion chamber, a compressor comprising a fan impeller and an electric motor, and a switch that can be actuated by a user, the method comprising:
    accelerating the electric motor to an operational rotational speed of more than 2000 revolutions per second as soon as the user actuates the switch, and increasing pressure in the combustion chamber to a target pressure of at least 1.3 times ambient pressure,
    feeding a combustible gas into the combustion chamber,
    igniting the mixture of air and combustible gas and switching off the electric motor as soon as the target pressure in the combustion chamber has been reached.

2. The control method for a handheld power tool according to claim 1, wherein the handheld power tool further comprises a tool controller and a safety mechanism, the method including accelerating the electric motor from the idle state to at least 75% of the operational rotational speed by the tool controller if the safety mechanism is actuated, and accelerating the electric motor to the operational rotational speed if the switch is actuated after actuation of the safety mechanism.

3. The control method according to claim 1, wherein the handheld power tool determines the temperature of the surroundings and adjusts the operational rotational speed based on the temperature.

4. The control method according to claim 1, wherein the handheld power tool has a control element for adjustment of a setting energy by the user, and the method includes determining the operational speed and the quantity of combustible gas to be injected into the combustion chamber on the basis of the adjusted setting energy.

5. The control method according to claim 1, including delivering a volume of less than 5 ccm per revolution by the fan impeller.

6. The control method according to claim 1, including increasing the pressure in the combustion chamber to 1.3 to 3.5 times ambient pressure.

7. The control method according to claim 6, including accelerating the electric motor to an operational rotational speed [D] of at least D=6700(K−1) in rotations per second to achieve a compression [K].

8. The control method according to claim 1, including switching the electric motor off after ignition of the mixture of air and combustible gas.

9. The control method according to claim 1, wherein the handheld power tool further comprises a safety mechanism, and the method includes switching the electric motor on in response to actuation of the safety mechanism.

* * * * *